(12) United States Patent  
Matzkel et al.

(10) Patent No.: US 8,738,683 B2  
(45) Date of Patent: May 27, 2014

(54) SYSTEM, APPARATUS AND METHOD FOR ENCRYPTION AND DECRYPTION OF DATA TRANSMITTED OVER A NETWORK

(75) Inventors: Ben Matzkel, Givatayim (IL); Maayan Tal, Be'er Sheva (IL); Aviad Lahav, Tel-Aviv (IL)

(73) Assignee: Vaultive Ltd., Tel Aviv (IL)

( * ) Notice: Subject to any disclaimer, the term of this patent is extended or adjusted under 35 U.S.C. 154(b) by 176 days.

(21) Appl. No.: 12/982,694

(22) Filed: Dec. 30, 2010

(65) Prior Publication Data

US 2011/0167102 A1 Jul. 7, 2011

Related U.S. Application Data

(63) Continuation-in-part of application No. PCT/IL2009/000901, filed on Sep. 15, 2009.

(60) Provisional application No. 61/096,891, filed on Sep. 15, 2008, provisional application No. 61/291,398, filed on Dec. 31, 2009, provisional application No. 61/306,207, filed on Feb. 19, 2010.

(51) Int. Cl.  
*G06F 15/16* (2006.01)

(52) U.S. Cl.  
USPC .......................................................... 709/202

(58) Field of Classification Search  
CPC . H04L 63/0428; H04L 12/5855; H04L 29/06; H04L 51/14; H04L 67/14; H04L 67/2852; H04L 69/329; H04L 67/04; H04W 4/12; H04W 4/24; H04W 8/18  
USPC ........................... 709/202, 206, 216, 217, 219  
See application file for complete search history.

(56) References Cited

U.S. PATENT DOCUMENTS

| 5,333,266 A | 7/1994 | Boaz et al. |
| 5,537,586 A | 7/1996 | Amram et al. |

(Continued)

FOREIGN PATENT DOCUMENTS

| EP | 1 633 108 | 3/2006 |
| GB | 2 349 960 | 11/2000 |

(Continued)

OTHER PUBLICATIONS

Raykova et al., "Secure Anonymous Database Search", CCSW'09, Nov. 13, 2009, pp. 115-126.

(Continued)

*Primary Examiner* — Jae Y Lee  
*Assistant Examiner* — Jean F Voltaire  
(74) *Attorney, Agent, or Firm* — Pearl Cohen Zedek Latzer Baratz LLP

(57) ABSTRACT

A method and system for securing data transmitted between a client device and a server by obtaining input text at an intermediate module, processing the input text to obtain processed text, and transmitting the processed text to the server. In particular, the server may be configured to provide at least one function on input data provided by the client device, and the intermediate module may be configured to receive input data from the client device, to transform the input data into processed data, and to transmit the processed data to the server. Embodiments of the invention may include systems and methods for intercepting the input data at the intermediate module without transmission of the input data to the server; providing the at least one function by the intermediate module on the input data; and generating by the intermediate module at least one message to the client device based on a result of the at least one function.

14 Claims, 10 Drawing Sheets

(56) References Cited

U.S. PATENT DOCUMENTS

| | | | |
|---|---|---|---|
| 5,585,793 | A | 12/1996 | Antoshenkov et al. |
| 5,870,084 | A | 2/1999 | Kanungo et al. |
| 5,958,006 | A * | 9/1999 | Eggleston et al. ............ 709/219 |
| 6,334,140 | B1 * | 12/2001 | Kawamata .................... 709/202 |
| 6,678,694 | B1 | 1/2004 | Zimmermann et al. |
| 7,155,442 | B2 | 12/2006 | Carlin et al. |
| 7,165,175 | B1 | 1/2007 | Kollmyer et al. |
| 2001/0044893 | A1 | 11/2001 | Skemer |
| 2002/0046253 | A1 | 4/2002 | Uchida et al. |
| 2002/0073099 | A1 | 6/2002 | Gilbert et al. |
| 2005/0060372 | A1 | 3/2005 | DeBettencourt et al. |
| 2005/0147240 | A1 | 7/2005 | Agrawal et al. |
| 2005/0165623 | A1 | 7/2005 | Landi et al. |
| 2005/0198170 | A1 * | 9/2005 | LeMay et al. ................. 709/206 |
| 2005/0235163 | A1 | 10/2005 | Forlenza et al. |
| 2006/0101285 | A1 | 5/2006 | Chen et al. |
| 2006/0143237 | A1 | 6/2006 | Peterson et al. |
| 2006/0251246 | A1 | 11/2006 | Matsui |
| 2007/0100913 | A1 | 5/2007 | Sumner et al. |
| 2007/0130069 | A1 | 6/2007 | Kay et al. |
| 2007/0168656 | A1 | 7/2007 | Paganetti et al. |
| 2007/0198206 | A1 | 8/2007 | Jagerbrand et al. |
| 2008/0005247 | A9 | 1/2008 | Khoo |
| 2008/0147816 | A1 | 6/2008 | Damm et al. |
| 2008/0276098 | A1 * | 11/2008 | Florencio et al. ............. 713/183 |
| 2009/0327748 | A1 | 12/2009 | Agrawal et al. |
| 2010/0169665 | A1 | 7/2010 | Kang et al. |
| 2011/0072489 | A1 | 3/2011 | Parann-Nissany |
| 2013/0067225 | A1 | 3/2013 | Shochet et al. |

FOREIGN PATENT DOCUMENTS

| | | |
|---|---|---|
| WO | WO 01/47205 | 6/2001 |
| WO | WO 2010/026561 | 3/2010 |

OTHER PUBLICATIONS

International Search Report for International Application No. PCT/IL2010/001097 mailed Sep. 6, 2011.

International Search Report for International Application No. PCT/IL2011/000396 mailed Oct. 4, 2011.

U.S. Office action for U.S. Appl. No. 12/982,688, dated Apr. 12, 2013.

U.S Office Action for U.S. Appl. No. 12/982,695 dated Dec. 11, 2012.

U.S Office Action for U.S. Appl. No. 12/982,690 dated Dec. 17, 2012.

U.S Office Action for U.S. Appl. No. 12/982,691 dated Dec. 17, 2012.

United States Office Action of U.S. Appl. No. 12/982,691 dated Oct. 15, 2013.

* cited by examiner

SYSTEM, APPARATUS AND METHOD FOR ENCRYPTION AND DECRYPTION OF DATA TRANSMITTED OVER A NETWORK

CROSS-REFERENCE TO RELATED APPLICATIONS

This application is a continuation-in-part application claiming priority from PCT/IL2009/000901, International Filing Date Sep. 15, 2009, which in turn claims priority from U.S. Provisional Patent Application Ser. No. 61/096,891 filed Sep. 15, 2008, the contents of which are incorporated herein by reference in their entirety.

This application also claims priority from U.S. Provisional Patent Application Ser. No. 61/291,398 filed Dec. 31, 2009, and from U.S. Provisional Patent Application Ser. No. 61/306,207 filed Feb. 19, 2010, the contents of which are incorporated herein by reference in their entirety.

BACKGROUND OF THE INVENTION

The Internet and the World Wide Web allow companies and organizations to offer services in a document, such as a digital form of web applications, to businesses and individuals who may access and utilize these services with a personal computer and a web browser. Making such documents and particularly applications available over a network is typically referred to as Software as a Service ("SaaS"). Some examples of applications that may be provided in SaaS form are electronic mail, instant messaging, productivity tools, customer relationship management, enterprise resource planning, human resources applications, blogs, social networking sites, etc.

This model has inherent security risks. User data, such as messages, customer records, and company financials, are stored on remote servers beyond the control of the provider of the user data. Storing personal or corporate information on remote servers exposes the data owner to many risks, and implies that the information's owner must trust the entity that owns the computer systems hosting the information and the network connecting the information owner and the hosting systems.

For instance, commonly known accounting software solutions require their customers to post accounting information to be stored on the solution provider's servers. In such systems, the customer must entrust the solution provider with the accounting information, thereby relinquishing a certain measure of control over the privacy and integrity thereof.

In certain software applications, a variety of encryption schemes are used to render data unintelligible to anyone who does not possess the appropriate decryption methods or keys. For example, application providers may enable and/or require an information owner to encrypt data in transit between a client and a host using secure socket layer (SSL) encryption or another method. This prevents an internet service provider (ISP) and other potential eavesdroppers from seeing the data itself during transit. The data is accordingly decrypted upon arrival to the hosted application, and the hosted application vendor may view and manipulate the owner's unencrypted data. However, this method exposes the sensitive data at the hosted application vendor.

U.S. Pat. No. 7,165,175, describes an apparatus and method for selectively encrypting portions of data sent over a network between client and server. The apparatus includes parsing means for separating a first portion of the data from a second portion of the data, encrypting means for encrypting only of the first portion of the data, and combining means for combining the encrypted first portion of the data with the second portion of the data. The apparatus further includes decrypting means installed at the client for decrypting the encrypted portion of the data.

PCT Patent Publication Number WO 01/047205, discloses enhanced computer network encryption using downloaded software objects. This application describes a method and a system for securing highly sensitive financial and other data contained in transmissions over a public network, such as the World Wide Web, linking a web server computer to a remote client computer. By determining a desired (usually strong) specific standard of encryption for all sensitive communications between web server and client, and "pushing" the capability to encrypt to such standard to the client by automatically downloading from the web server to the client, and executing within the client's web browser, software objects to perform encryption/decryption tasks pursuant to the chosen standard, strong encryption is readily assured even if the client did not originally have such strong encryption capabilities.

One problem with the application of these approaches to hosted SaaS applications is that such applications require that operating information, e.g., data made available for manipulation over the network, be unencrypted in order to allow manipulation of the information by the application provider, thereby exposing the data to the application provider, and otherwise rendering the data vulnerable to security concerns during manipulation.

SUMMARY OF EMBODIMENTS OF THE INVENTION

In a system including a server, a client device, and an intermediate module, wherein the server is configured to provide at least one function on input data provided by the client device, and wherein the intermediate module is configured to receive input data from the client device, to transform the input data into processed data, and to transmit the processed data to the server, embodiments of the invention may include systems and methods for intercepting the input data at the intermediate module without transmission of the input data to the server; providing a function by the intermediate module on the input data; and generating by the intermediate module at least one message to the client device based on a result of the function.

Embodiments of the invention may further include obtaining at the intermediate module a response to the at least one message from the client device; based on the response, processing the input text to obtain processed input text; and transmitting the processed input text to the server.

According to some embodiments of the invention, the function may be a spell-checking function, wherein the message is a result of the spell-checking function on the input data. According to some embodiments of the invention, the function may be a format-checking function on the input data, wherein the input data may be in a first format, and wherein the message is a request to provide the input data in a second format different from the first format. In some embodiments of the invention, the first format may be a delta-encoded format, and the second format may be a full input text format.

BRIEF DESCRIPTION OF THE DRAWINGS

The foregoing and other objects, features, and advantages of the present invention will become more apparent from the following detailed description when taken in conjunction

DETAILED DESCRIPTION OF EMBODIMENTS OF THE INVENTION

Figure 1:
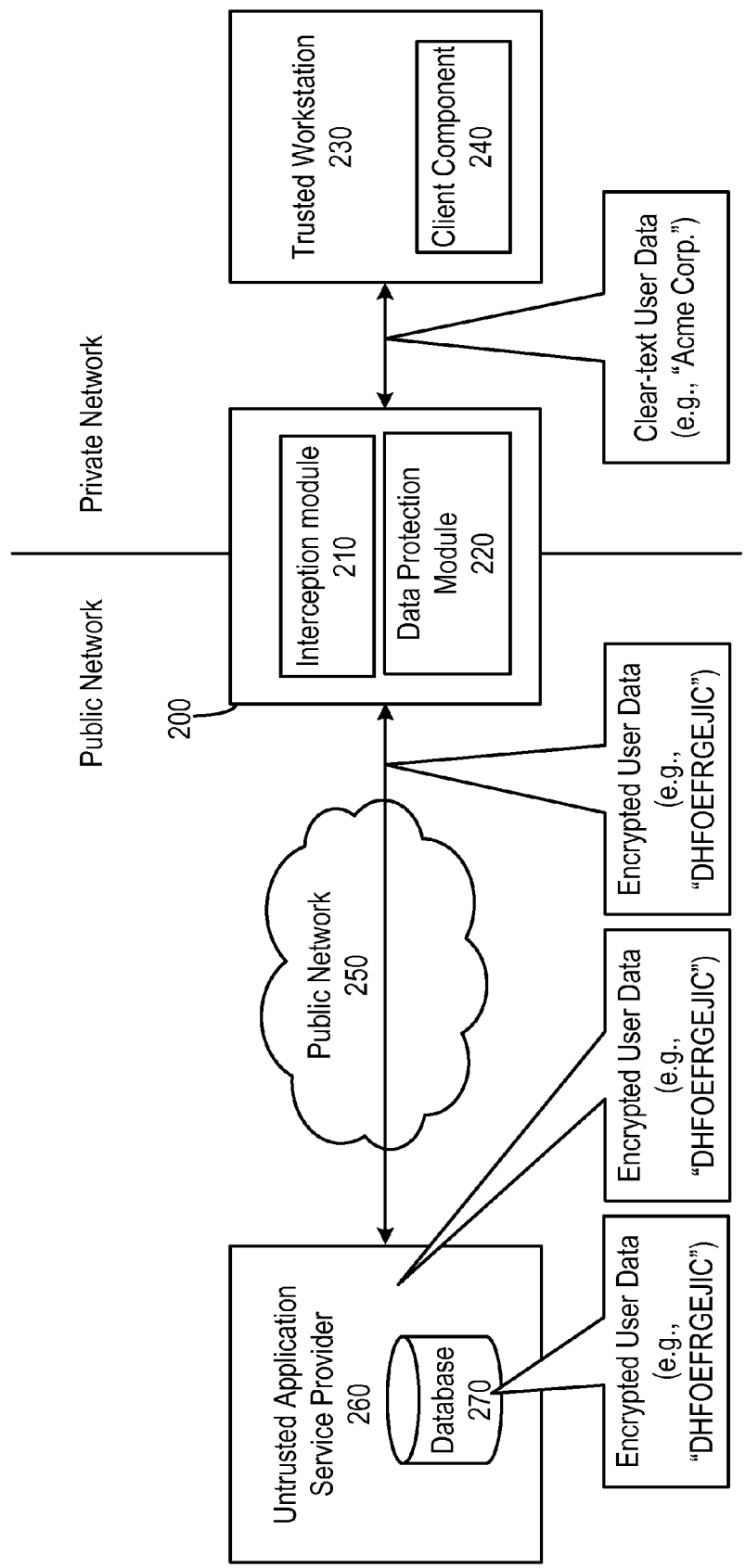
FIG. 1 illustrates a system including an intermediate module and its environment according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

A computing system according to embodiments of the invention may be any suitable article, processor, chip, controller or suitable computing device suitable for processing data as described herein as well as controlling components in a device. In some embodiments the task of data processing may be distributed among a number of controllers, processors or computing systems. An intermediate module or processor associated therewith may include a controller that may be, for example, a central processing unit processor (CPU), a chip, or any suitable computing or computational device or a multiplicity thereof.

Reference to memory may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory may be or may include a plurality of, possibly different memory units.

Reference to data a storage device may be or may include, for example, a hard disk drive, a floppy disk drive, a Compact Disk (CD) drive, a CD-Recordable (CD-R) drive, a universal serial bus (USB) device, a redundant array of independent disks (RAID), or any other suitable removable and/or fixed storage unit or to a memory as described above.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

An intermediate module according to embodiments of the invention may include software, hardware, firmware or any combination thereof, or a multiplicity thereof.

General Data Flow

Reference is made to FIG. 1, which illustrates a system including an intermediate module 200 and its environment according to an embodiment of the invention, as well as a flow of data from client module at workstation 230 to application service provider at network node 260.

Intermediate module 200 may include an interception module 210 and a data protection module 220. Intermediate module 200 may be operatively connected to a client terminal 230, e.g., a trusted workstation, and to a network node 260, e.g., an application service provider, via a network, such as public network 250. It will be understood that FIG. 1 is an exemplary embodiment of the invention, and that other network configurations are possible. For example, trusted workstation 230 and intermediate module 200 may be remote from each other, for example, operatively connected over a trusted network link.

For example, trusted workstation 230 may be connected to a plurality of intermediate modules, including for a plurality of organizations, and intermediate their data traffic with one or more application service providers over a public network.

It will be recognized that reference is made throughout the present application to an intermediate module, however, the module may reside on the client device, at a gateway server, e.g., on premises associated with the client device, or at a separate server or servers in communication with the trusted client device and the untrusted server.

Thus, for example, the interception and/or data protection modules may be installed on the trusted workstation, possibly as a browser plug-in, possibly as an operating system driver or module, possibly as a software library and possibly as another software component.

In another example, the intermediate module may be positioned right in front of the untrusted application, where all accesses to the untrusted application pass through the intermediate module.

In yet another example, the intermediate module may be a separate server to which client module transmits input data, which in turn transmits the processed data to the untrusted server.

A trusted workstation 230 may be a client computer having installed thereon a client component 240 that may interact with the intermediate module. Client component 240 may be a web application HTML form running in a web browser while network node 260 can be an HTTP web server of a SaaS vendor. Client component 240 can include API client software and, additionally or alternatively, any other method of remotely accessing network node 260.

End users can use client component 240 to enter, retrieve and manipulate data, intended to be passed to, or retrieved from, network node 260. End users may include human users utilizing a software agent (e.g. a web browser) and automated agents using a client API.

Interception module 210 of intermediate module 200 may intercept or otherwise receive input (unprocessed) text from trusted workstation 230, and provide the input text to data protection module 220 for processing. Interception module 210 may intercept the data flowing between client component 240 and network node 260, can modify it, and can interfere with the normal data flow. For example, the interception module may trigger an authentication session in order to determine that an end user can access data stored in network node 260. Interception module 210 can be (or be executed by) a web proxy server.

Data protection module 220 may receive input text and process it selectively. Input text that is not selected to be processed may be transmitted as unprocessed text to network node 260 for manipulation and/or storage in storage system 270 substantially without processing, or with less processing than text selected for processing. For text to be processed, data protection module 220 may process the input text to provide processed text, which may be provided over public network 250 to untrusted application service provider 260 for storage, manipulation, etc. According to embodiments of the invention, therefore, application service provider 260 may thereby not receive the unprocessed text, but rather store and manipulate processed text. As described below, the processing may include applying a search- and/or sort-enabling encryption scheme, to thereby provide encrypted text data. According to embodiments of the invention, the processing may selectively encrypt text, selecting which input text to transmit to application service provider 260 in processed form, and which input text to transmit in unprocessed form.

It will be understood that intermediate module 200 may include one or more servers, one or more workstations, one or more personal computers, one or more laptop computers, one or more media players, one or more personal data accessories, one or more integrated circuits, and/or one or more printed circuit boards, dedicated hardware, or a combination thereof.

Data Flow Intervention

Intermediate module 200 may include or provide functionality additional to or unrelated to encryption and/or decryption, and may alter the normal message flow between the client trusted workstation 230 and the server untrusted application 260. Such additional functionality may have the effect of compensating for server-side functionality lost due to encryption.

According to embodiments of the invention, the intermediate module may receive input data from the client device, intercept said input data, e.g., prevent or otherwise not allow the input data to be transmitted to the server, and the intermediate module may provide the relevant function on the input data that the server would otherwise provide. For example, the intermediate module may generate at least one message to the client device based on a result of the function.

According to some embodiments of the invention, the intermediate module may obtain from said client device a response to the at least one message, based on the response, process the input text to obtain processed input text, and transmit the processed input text to the server.

For example, a server may generally check the spelling of input text and provide the user with a feedback message, for example, indicating misspelled words and suggesting corrections. However, when the text received by the server is encrypted, in accordance with embodiments of the present invention, the server may not be able to perform spell checking without decrypting the processed text. Therefore, in accordance with embodiments of the invention, the intermediate module may provide additional functionality, for example, spell-checking, on input text, and may provide the user with a feedback message, e.g., a result of the spell-checking function on the input data, such as an error message, a suggested spelling correction, or a message that no errors were detected.

In one embodiment of the invention, such additional functionality may include replacing server-side search functionality, for example, by storing a copy of the user data (or a portion thereof) and searching it in the intermediate module in response to a search request made by the client.

In an embodiment of the invention, such additional functionality may include triggering an authentication session between the client and the intermediate module before allowing user data to be encrypted and decrypted.

In an embodiment of the invention, such additional functionality may include format-checking input data, and if appropriate, for example, if the input data is in a first format, requesting the client to send information in a second format, different from the first format. Such received and/or requested formats may include, for example, (a) a delta-encoded format of the input text wherein only differences from a known version of the input text are transmitted, (b) a full version of the input text, (c) the input text contained in a specific document format, or a combination thereof. For example, input data may be received in a delta-encoded format, and the intermediate module may request the input data in a full input text format. Other examples of specific document formats include but are not limited to PDF, DOC, HTML, etc.

According to embodiments of the invention, the processed text may be stored at network node 260, for example, in storage system 270, and manipulated remotely over public network 250. As described below, the processing may be such that searching and/or sorting may be enabled on the processed text, in such a manner as to be transparent or unseen by the trusted user and/or the untrusted server application, without decrypting the processed data at the application service provider. In the below description, storage system 270 is at times denoted a database; however, it will be recognized that storage system 270 may be any suitable digital storage architecture, and may be stored on any suitable hardware, e.g., a redundant array of independent disks (RAID), etc.

Accordingly, as shown in the illustrative data flow in FIG. 1, trusted workstation 230 may provide unprocessed input data such as "Acme Corp." for use by application service provider 260. The input text may be intercepted at intermediate module 200, for example, by interception module 210, and processed by data protection module 220. Data protection module 220 may process the input text into one or more individual text units referred to as tokens, and control data, which may be encrypted, shown schematically as processed data "DHFOEFRGEJIC", and send the processed data over network 250 to untrusted application service provider 260, where it may be manipulated by users and/or stored in database 270. It will be understood that "DHFOEFRGEJIC" is schematic, and that any suitable encryption algorithm may be used, for example, resulting in any symbol set. As described below, according to one embodiment of the invention, non-Latin characters or symbols may be used, for example, Korean or Chinese language symbols.

Figure 2:
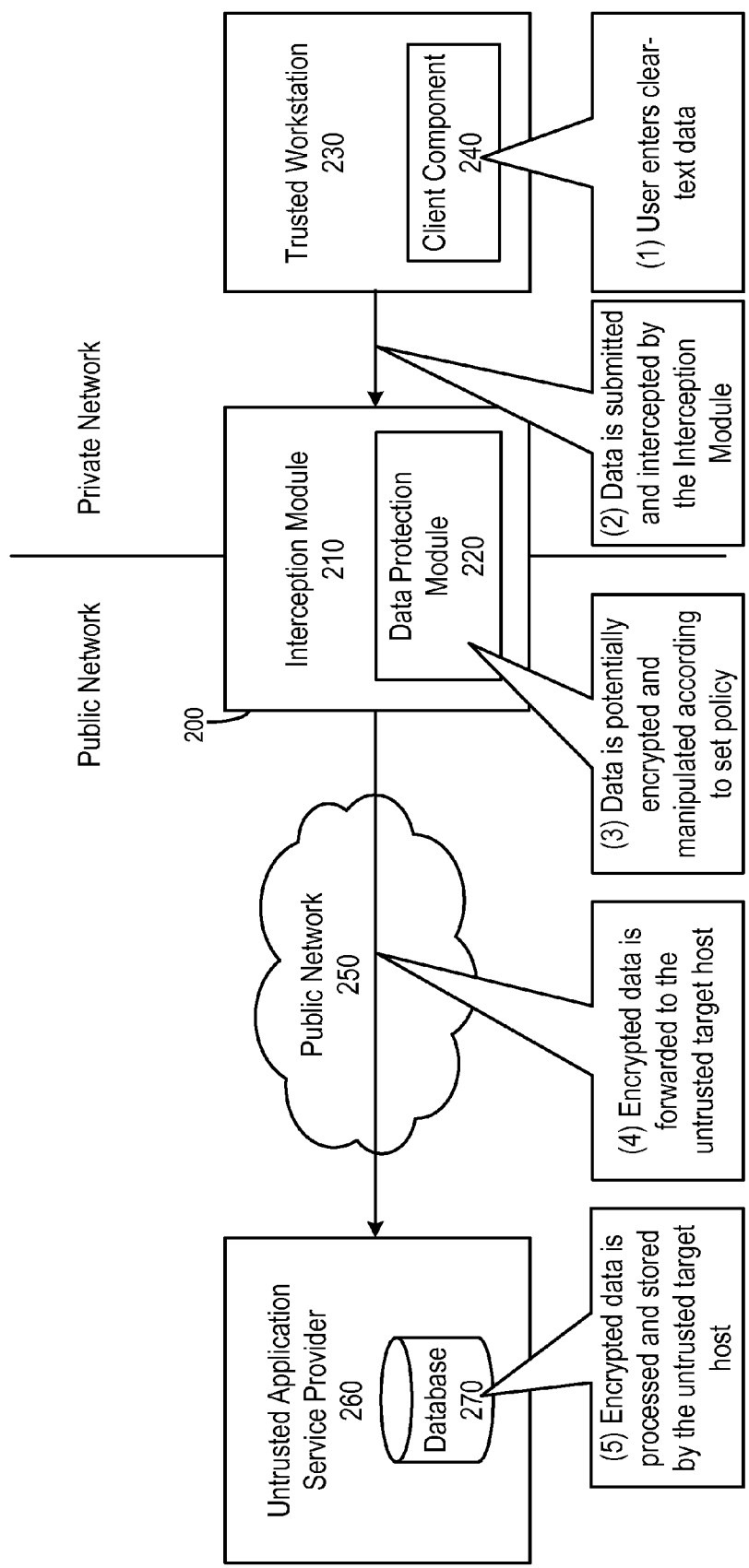
FIG. 2 illustrates a flow of data from a client terminal to a network node, according to an embodiment of the invention.

Reference is made to FIG. 2, which illustrates a generalized flow of data from client terminal 230 to application service provider 260, according to an embodiment of the invention. The end user may provide input text that is not encrypted (clear text). The input data may be transmitted from client terminal 230 towards network node 250 and be intercepted by interception module 210. Interception module 210 may provide the input text to data protection module 220 that processes the input data to provide processed data, wherein the processing includes encrypting at least a portion of the input text. The processed data may then be sent to interception module 210, which in turn transmits it over public network 250. The processed data may be received by network node 260 for manipulation by an application, e.g., a SaaS application, and stored in database 270. It will be understood that the input data may be new or updated data to be stored in storage system 270, or it may be any data provided to an SaaS application for real time manipulation, for example, one or more parameters of a command, e.g., a search command.

Figure 3:
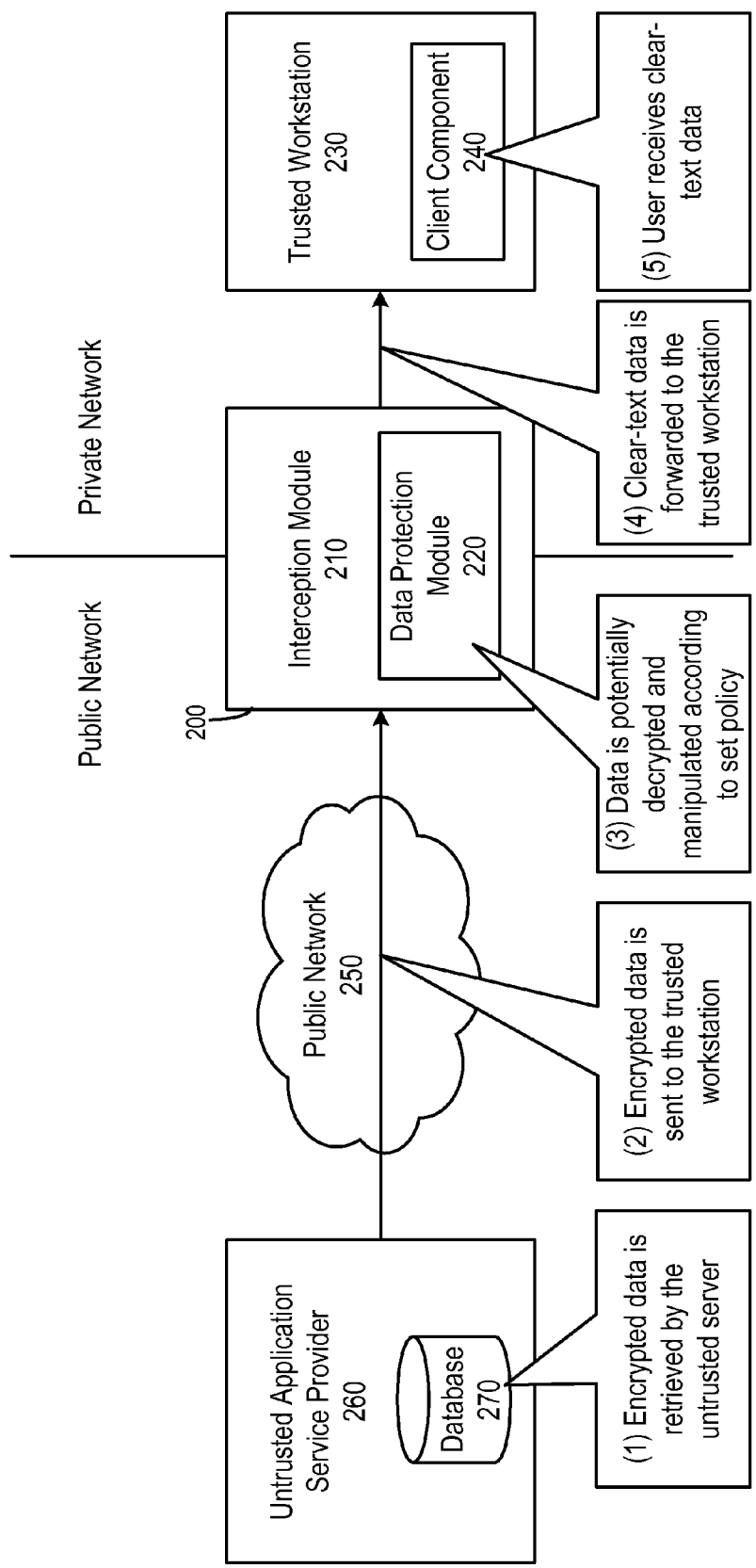
FIG. 3 illustrates a flow of data from a network node to a client terminal, according to an embodiment of the invention.

Reference is made to FIG. 3, which illustrates a flow of data from network node 260 to client terminal 230, according to an embodiment of the invention. Such a process may be initiated by a user at workstation 230 by making a retrieval or search request. The parameter of the request, e.g., the terms to be searched for, may be processed as described above in connection with FIG. 2, and the application at network node 260 may search or sort the processed data, possibly based on the processed parameter provided. Network node 260 may retrieve processed data, for example, in response to a search or retrieval request, where the processed data may include some encrypted portions. The processed data may be sent over public network 250 towards client terminal 230. Interception module 210 may intercept the processed data and provide it to data protection module 220 to identify any encrypted data within the processed data. Any identified encrypted data may be decrypted, and provided to interception module 210 to resume data communication. Interception module 210 may forward the unprocessed data (decrypted plaintext data) to client component 240 for display to a user.

Tokenization and Normalization Generally

Figure 10:
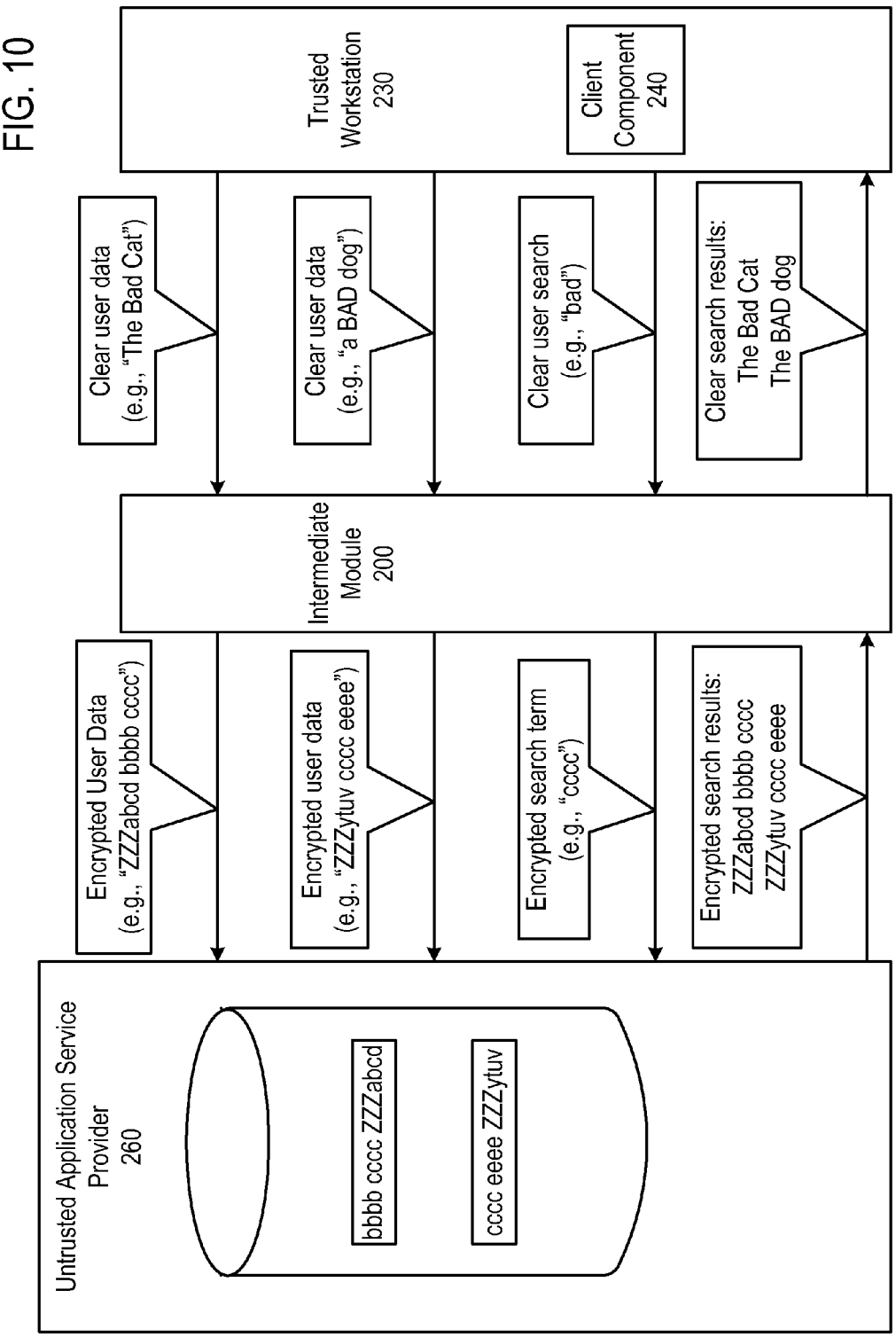
FIG. 10 schematically illustrates a flow of data enabling searching of encrypted user data in an embodiment of the present invention.

The application running on network node 260 may be requested to search stored data and return a result. FIG. 10 schematically illustrates a flow of data enabling searching of encrypted user data in an embodiment of the present invention.

First, the client 240 may enter data and make several store requests to the untrusted application 260 passing through the intermediate module 200. The intermediate module encrypts user inputs such that every searchable word is mapped onto an encrypted searchable word, such that every input searchable word has exactly one corresponding encrypted searchable word. Encrypted searchable words may be normalized before encryption.

For example, in FIG. 10 the words "BAD", "Bad" and "bad" are all encrypted into the encrypted word "cccc", so searching for "bad" provides results containing "BAD" and "Bad".

In FIG. 10 the words "the" and "a" are considered non-searchable and do not result in an individual encrypted searchable token. Conversely, the words "dog" and "cat" map into the encrypted searchable words "eeee" and "bbbb" respectively. The information holding the case markers for the searchable words and the non-searchable words is contained in the encrypted tokens "ZZZytuv" and "ZZZabcd".

Figure 4:
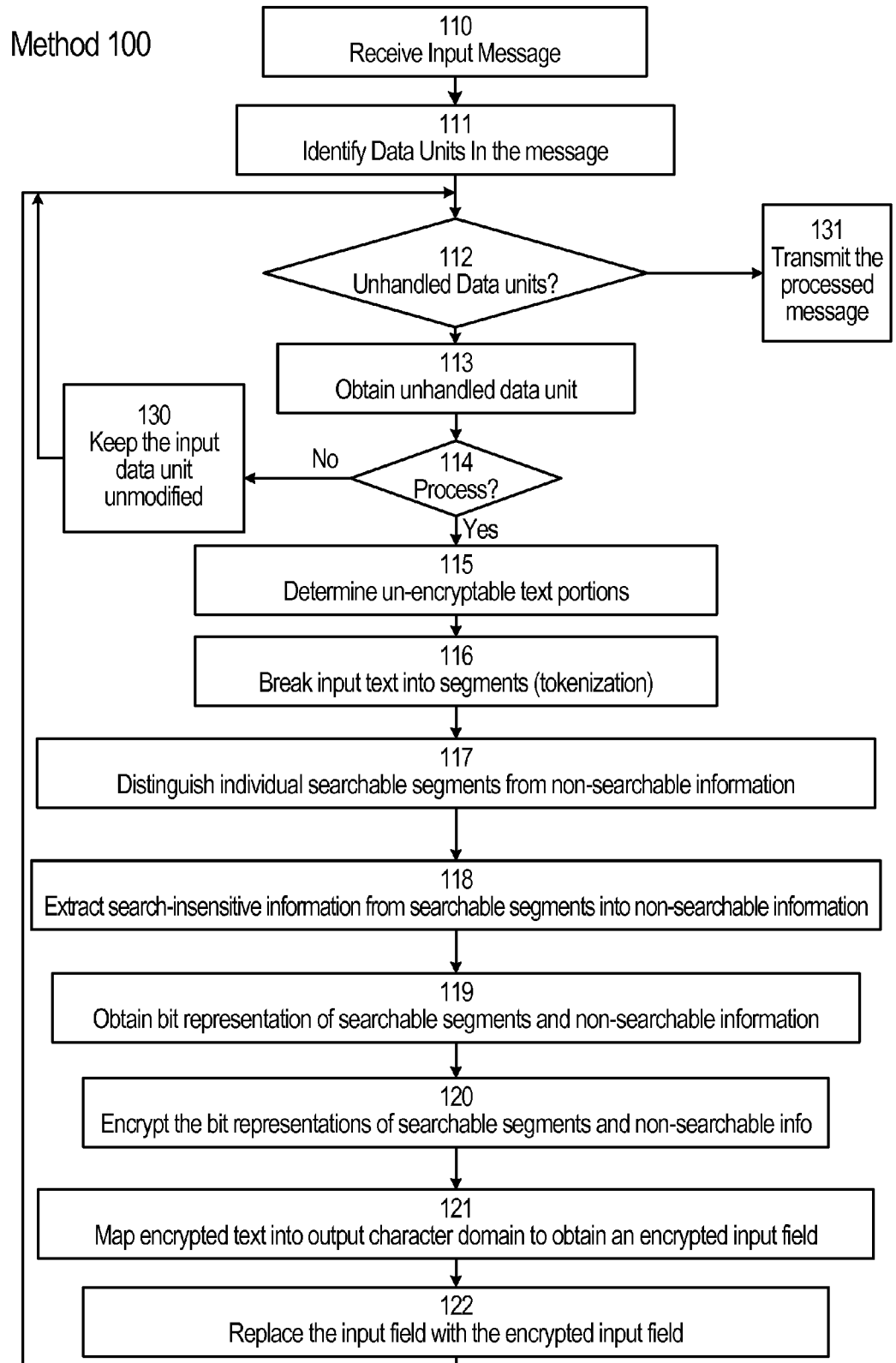
FIG. 4 illustrates a method for encrypting data allowing server-side searching and indexing of encrypted data, according to an embodiment of the invention.

Reference is made to FIG. 4, which is a schematic illustration of a data processing method 100 designed to enable server-side searching and/or indexing of user textual data, according to an embodiment of the invention. Method 100 may be applied by an intermediate module, for example, by a data protection module as described above. It will be understood that the method of receiving processed data and converting it to unprocessed data may be substantially the reverse of the described method.

Method 100 starts at stage 110 by receiving input message, for example, by an intermediate module operatively connected between a client terminal and a network node.

At stage 111, the method may identify individual data units within the input message to be handled. For example, an input message may include a First Name field, a Last Name field, and a Document Body field.

At stage 112, the method may iterate over all identified data units, first obtaining an unhandled data unit at stage 113, then selecting whether or not to process the obtained data unit. Processed data units may be processed individually or collectively.

At stage 114, the method may then determine whether to process the input data. Input data that are not modified are retained (stage 130). At stage 115, the method may determine whether and/or what portions of the input data unit text should be processed. For example, portions of an input text not suitable for encryption may include search connectors such as "OR", "AND", or application-specific significant text markup such as "{important}" or "@location", indicating a special kind of server processing to be carried out on the data.

For input text to be processed, the method proceeds to stage 116, in which the input text is broken down into individual text units called tokens (the process of determining tokens from the input text is referred to herein as tokenization). It will be recognized that tokenization is optional, and method 100 may include (a) encrypting all input data together as a single token, (b) encrypting input data determined to be suitable for encryption separately, to provide a plurality of processed tokens, wherein each processed token represents a piece of input text, or (c) a combination thereof.

The method may then proceed to stage 117, in which certain input tokens may be recognized as unsuitable for searching. For example, the criterion for determining each individual word may be a list of predefined words, a threshold word frequency in a word frequency list such as English dictionary frequency list, the length of the word, or a combination thereof.

At stage 118, the method may extract information unimportant for searching from searchable input tokens, for example: letter case, letter diacritics, ligature breakup, Unicode character composition or decomposition (as defined by the Unicode standard). The extracted information may be stored for later use in a separate location and may be placed in an output token called a control token. The text tokens may be converted into a normalized form which does not contain the extracted information. This process is referred to herein as normalization. It will be recognized that normalization is optional, and may be done in any suitable manner.

At stage 119, the method may obtain bit representations of all information units to be encrypted, including searchable tokens, information extracted from searchable tokens, and other portions of the input, in order to encrypt it using a cryptographic cipher. Information units may be classified as searchable or non-searchable. Non-searchable information units may be combined or broken up. The order of searchable tokens in the input text may be changed, and an indication of the original order may be added to the non-searchable information units.

At stage 120, the method may encrypt information units by using a cryptographic cipher, such as AES or DES.

At stage 121, the method may convert the encrypted bit representations into output text units consisting of a sequence of characters taken from a character set, for example, one or more predefined contiguous portions of Unicode, as described in further detail below. This character set may be defined in advance to assist decrypting.

At stage 122, the input data unit in the input message may be replaced with the output text obtained at stage 121.

The method may continue to apply stages 112-122 to all identified input units, and then transmit the processed message to the network node hosting the server application (stage 131).

Tokenization

As described above, the data processing method may involve tokenization, which in turn may involve a number of steps. It will be understood that some of the steps described in connection with the illustration of tokenization below are optional. Furthermore, it will be understood that de-tokenization, i.e., converting tokenized processed data into unprocessed data, may be substantially the reverse of the described method.

In order to enable searching over encrypted user data, input texts may be broken into a number of segments in a process called tokenization. Segments holding individually searchable terms are called (unprocessed) input tokens, where input tokens are typically whole words. Input segments that are not tokens are added to an information set called a Non-Searchable Information Set. Such segments may include punctuation, space characters, and other characters.

In connection with tokenization, several words may be combined into a single token, or a single word may be broken into two or more constituent tokens. For example, compound words like "whiteboard" may be decomposed into individually searchable tokens "white" and "board". For example, languages such as Chinese or Japanese do not usually use spaces or another distinct character to separate words in written text, and thus a single Chinese input text may be broken into several input tokens. The indication of such combination or breaking may be added to the non-searchable information set.

Tokenization may include detection of morphological variants of words, modifying the input token to a normalized form and adding an indication of the original input token to the non-searchable information set. For example, morphological invariants of words may include plural versus singular noun forms ("word", "words"), verb conjugation ("cry", "cried", "crying"), etc.

Tokenization may include detection of words unlikely to be searched for, and their removal from the set of searchable input tokens and addition to the non-searchable information set. For example, such detection may use (a) a predefined set of words, (b) a dictionary holding word frequency list and a threshold frequency where words with frequency above the threshold frequency are considered unsearchable, (c) a minimum and/or maximum length for a searchable word, or (d) any combination thereof.

Tokenization may support server-side searching and/or indexing which ignore certain character properties, such as letter case, diacritics, ligatures or Unicode composition/decomposition. For example, searching for "ToKeN" and "tOkEn" may produce the same results when searching text, having all strings containing a variant of the word "token" to appear on the search results.

Supporting such property-insensitive searching may be performed by (1) converting every input character into a single canonical form, (2) producing an indication of the original character, and (3) adding this indication to the non-searchable information set. For example, tokenization may support case-insensitive searching on the server side by converting input token characters into a single letter case (e.g. lowercase) and adding an indication of the original letter case to the non-searchable information set.

For example, diacritical marks may be ignored during searching, Ignoring added, removed or modified diacritical marks, e.g., "È" or "Ë" or "E". For example, a search for "cafe" will match user data such as "Café", "CAFE", "cÄfe" or "çafe". The system may convert all these word instances into the normalized form "cafe" add an indication of the original diacritics to the non-searchable information set.

For example, the system may support ligature-insensitive searches (for example, desmon and daemon). The system may convert ligatures into normalized form such as converging "æ" to "ae", produce an indication of the original ligature, and add it to the non-searchable information set.

Figure 6:
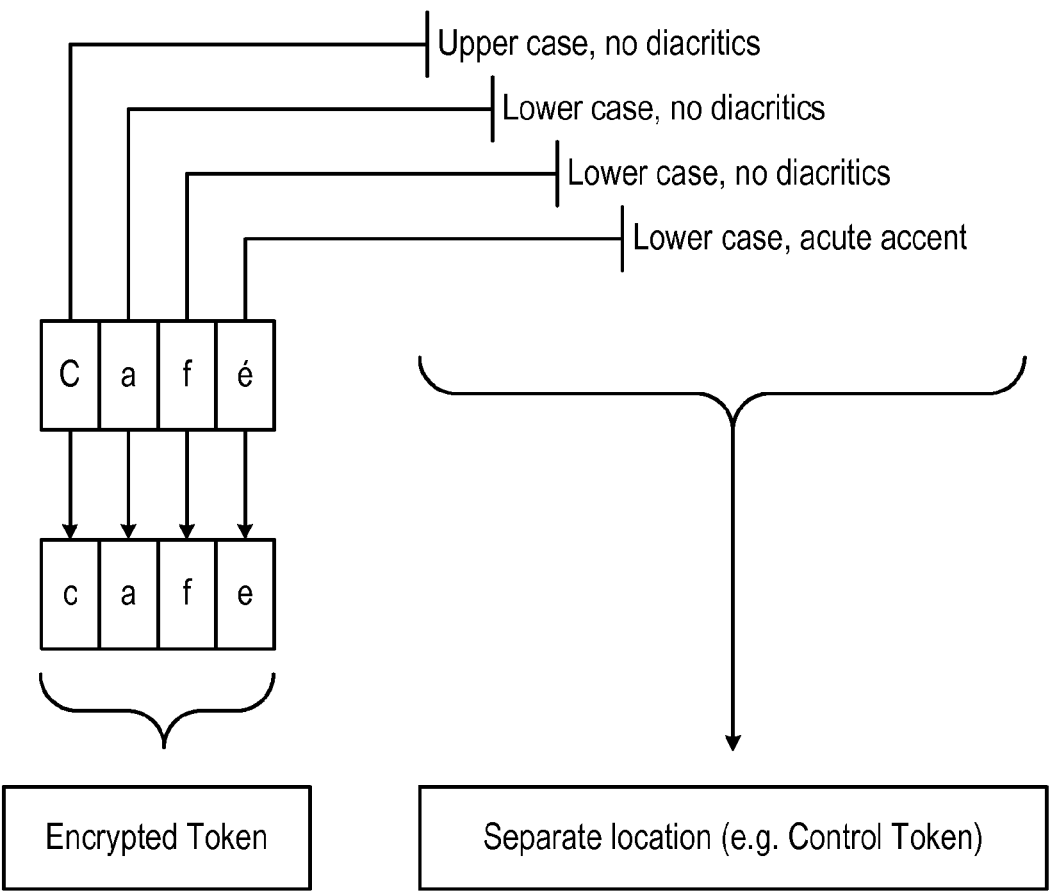
FIG. 6 illustrates an example for processing a word, according to an embodiment of the invention.

Reference is made to FIG. 6, which illustrates processing of the word "Café". The input text is stripped of the uppercase and diacritics, and converted to the token "cafe". The associated control token indicates that the first letter is uppercase, and that the fourth letter has an acute accent. According to some embodiments of the invention, letters may be assumed to be lowercase with no diacritics, so that the control token need not indicate lowercase letters or absence of diacritics.

Text Markup and Augmentation Information

According to an embodiment of the invention, processing input text may include detection of application-specific text at least one handling instructions, and may either add these handling instructions to the non-deterministically transformed text or leave this information in clear text in the processed text, so that the untrusted server may apply any kind of handling related to this text augmentation information. For example, HTML is a text augmentation which may add formatting information to user text by embedding HTML tags in the text. The system may handle input HTML tags by at least one of: (1) adding HTML tags to the non-searchable information, (2) including input HTML tags in the output processed text without encryption to allow server-side handling, (3) treating HTML tags as normal text, e.g., applying any handling performed on non-HTML-tag input text to the HTML tags.

According to some embodiments of the invention, upon detecting at least one handling instruction in input text, the intermediate module may decide not to transform said at least one handling instruction.

According to some embodiments of the invention, upon detecting at least one handling instruction in input text, the intermediate module may decide to transform said at least one handling instruction non-deterministically.

The system may add context information to the non-searchable information set, such as the time, the user, or other information known to the system when producing processed text.

For example, in accordance with embodiments of the invention, the system may add custom indications to the encrypted tokens such as "important" or "sensitive", such that upon decryption these indications may be noticed, an event indicating the decryption of the input information may be generated, and this event handled, for example, by adding a record to a log file.

Token Ordering

Processing the input text may include changing an order of input tokens within the processed text. When an order is changed, token order indication may be generated to indicate an order of the input tokens in the original input text, and may be added to the non-searchable information set.

Excess Tokens

Processing the input text may include generating at least one fake or decoy excess tokens to be included in the output text. Such decoy tokens can make the encrypted text more robust to statistical analysis. The excess decoy tokens may be added with an intended target statistical distribution in order to disguise decoy tokens and make decryption by statistical analysis yet more difficult. The at least one excess tokens are distinguishable from other tokens included in the processed text only after gaining access to a secret key. For example, English-language word frequencies may be used as a model for the target distribution of decoy tokens.

Tokenization Process

The non-searchable information set may be arranged in one or more non-searchable tokens (also referred to herein as control tokens), which may be included in the processed output text. The control tokens may be placed before the normalized set of input tokens, after the normalized set of the input token, or can be located within the normalized set of input tokens. The non-searchable information set may be fully or partially encrypted, and then included in the processed output text.

Before encryption, bit representations of non-searchable information set and searchable tokens may be obtained. Obtaining such bit representations may include compressing and encoding input data in certain encoding and compression schemes.

Error detection indication may be generated and added it to the non-searchable information set. For example, a checksum of the input text may be calculated and added to the non-searchable information set.

The obtained bit representations of input tokens and possibly the non-searchable information set may then be encrypted wholly or partially. Encryption of searchable input tokens may provide a single encrypted form for every instance of a searchable input token. Encryption of non-searchable information may provide a single or multiple encrypted forms for every instance of the same information set. Multiple encrypted forms may provide better security, but can render certain server-side operations difficult or impossible without decrypting the user data. Multiple encrypted forms may use at least one bit of cryptographic salt embedded in the encrypted form.

The encrypted forms may then be converted into textual forms using a suitable encoding scheme. Such an encoding scheme may provide at least one of the following properties: (a) separation of encrypted tokens to allow an untrusted server application to determine searchable units within the processed text, (b) using a character set which does not cause an untrusted server application to determine searchable units (for example, the character "+" may be used to separate words by an untrusted server application and therefore may not be suitable for encoding encrypted tokens; for example, using both English and Hebrew characters may cause an application to separate sequences of both sets), (c) providing a compact representation such that server-side length limitation are less likely to be met, and (d) using an efficient algorithm in the intermediate module for encoding and decoding.

According to some embodiments of the invention, processed text may comprise a string of characters selected from a predetermined character set, for example, a character set comprising at least one contiguous subset of the Unicode character set. In some embodiments, the at least one contiguous subset may include characters in the letter character category, the number character category, or both. In some embodiments, the characters selected for use in the processed text may be selected from among a plurality of contiguous subsets of the Unicode character set, for example, two, three, four, or five separate subsets of the Unicode character set may be selected. In some embodiments, the number of subsets may be more than one and less than or equal to ten subsets of the Unicode character set.

In some embodiments of the invention, the subset of the Unicode character set may be one or more subsets selected from Korean Hangul, Chinese, Japanese and Korean (CJK) Unified Ideographs, and a combination thereof. Accordingly, for example, Korean language characters may be used for server applications storing user input using UTF-16 encoding. As Korean characters represent a single range within the Unicode character set which contain only letter characters, they have an efficient encoding and decoding implementation. For example, Chinese character set may be used for the same reason but having a greater range than Korean; however, use of the Chinese character set may not be suitable in server application that separately search and/or index every individual Chinese character.

For example, a possibly modified BASE64 encoding may be used for server applications storing user input using UTF-8 encoding. BASE64 encoding itself contains the characters "+" and "/" which may cause server applications to conclude that a single encrypted token has one or more encrypted words.

For example, space characters may be used to separate encrypted tokens. Another character such as a period "." may be used to separate encrypted tokens where space characters are not expected, for example in email address fields.

Processed output text may be included in unencrypted text when being received at the intermediate module, when sent from the untrusted server. In order to trigger decryption, the system may generate a statistically significant feature in processed text. For example, the system may include a rare character or combination of characters in the processed text, to be searched for when detecting encrypted text within unencrypted text.

According to some embodiments of the invention, processed output text may be arranged in more than one output token, such that output tokens do not exceed certain length limits For example, a length limit of 50 characters may be applied to the first output token and a length limit of 1000 characters may be applied to subsequent output tokens.

Combining Deterministic and Non-Deterministic Encryption

Some embodiments of the invention may use deterministic or non-deterministic transformations of input text, or a combination thereof. Embodiments of the present invention may decide whether to transform input data (or portions thereof) deterministically or non-deterministically, or a combination thereof, then based on such decision, transform the input text deterministically or non-deterministically, or a combination thereof using at least one secret key to thereby obtain processed text, and transmit the processed text to the server.

As used herein, a non-deterministic transformation to an input text is one whose result may be one of a plurality of possible outputs. A deterministic transformation to an input text is one that may include only one possible output. Both kinds of transformations may typically use or depend on a secret key for determining the possible output or outputs.

According to embodiments of the invention, deterministic token representations may be obtained, e.g., by applying reversible encryption depending on a secret key, or using an irreversible encryption using a secret key. Non-deterministic tokens representations may be obtained, e.g., by applying a symmetric encryption algorithm using a secret key, or by applying an asymmetric encryption algorithm, using the private key of a public-private key pair as a secret key, or by other reversible transformation depending on a secret key.

In some embodiments of the invention the server may provide search functionality over previously entered input texts. The intermediate module may choose in such case to deterministically transform individual searchable tokens within the input text. Such deterministic transformation may allow future search queries containing processed searchable terms to be processed correctly at the server. Portions of the input text may be transformed non-deterministically, for example, in order to provide enhanced security. According to embodiments of the invention, portions of input text may be transformed deterministically in order to allow server-side functions requiring exact matches between recurring instances of portions of input texts. For example, if a server may compare multiple revisions of an input text, wherein each revision is slightly different from its respective preceding revision, the server may provide a word-by-word or line-by-line difference analysis. Therefore, in such an example, deterministically transforming words or lines of input text allows such exact-match semantics on the server.

For example, the step of processing input text in an embodiment of the invention may include (1) encrypting some or all of the input text into one or more processed tokens in a non-deterministic fashion, (2) generating processed tokens corresponding to some or all suitable input tokens of the input text (e.g., after tokenization, normalization of the input text, etc.) in a deterministic fashion, and (3) including both the non-deterministically and deterministically transformed processed data in the output processed text for transmission and storage at the network node.

According to some embodiments of the invention, the decision whether to transform the input text deterministically or non-deterministically, or a combination thereof may be based on whether said word is member of a set of words. In this fashion, for example, input tokens to be made available for searching may be transformed deterministically, thereby enabling a search on such words. Upon location of a record based on the search, the processed input text, which may include deterministically and non-deterministically transformed processed data may be returned as a search result. Conversely, input tokens not made available for searching need not be transformed deterministically.

In some embodiments of the invention, the decision whether to transform the input text deterministically or non-deterministically, or a combination thereof may be based on the length of the word. Thus, for example, it may be decided to transform a word of the input text non-deterministically based on a length of said word. Thus, for example, in an example of an embodiment of the invention, short words, e.g., words containing less than three characters, may be transformed non-deterministically, while longer words, e.g., words having three or more characters, may be deterministically transformed. Accordingly, in such a scheme, short words having less than the minimum number of characters may not be searchable.

In an embodiment of the invention, the non-deterministic transformation may be performed using a first key, and the deterministic transformation may be performed using a second key.

In some embodiments of the invention, the first key and the second key may be identical. In other embodiments of the invention, the first and second keys may be different.

In some embodiments of the invention, one or more deterministically generated tokens may be dropped or eliminated if the overall length of the output text exceeds a length limit In some embodiments of the invention, the decision may be made not to transform at least a portion of the input text.

It will be recognized that the process of retrieving processed text according to embodiments of the invention may operate in substantially the reverse fashion. That is, processed text may be received at the intermediate module, and a suitable reverse processing may be applied on the processed text to obtain original input text. In some embodiments of the invention, the original input text may be sent or otherwise provided to the client device, for example, to be displayed or provided to a user or application operating the client device.

Processing of Search Queries

Input text received at the intermediate module may be search queries including at least one search term to search for. Search query input texts may be processed by the intermediate module in order to (a) facilitate correct search functionality at the network node, and (b) enable decryption of the search query at the intermediate module, if the network node sends it back to the client. Search queries are generally processed at the network node in the same manner as other input texts are processed, and may apply further processing stages.

In some embodiment of the invention, the step of transforming the input text may comprise deterministically transforming at least one search term in the search query using a first key to produce at least one deterministically transformed search term. Accordingly, the step of transmitting the processed input text to the server may comprise transmitting the plurality of deterministically transformed search terms to the server. In some embodiments of the invention, a plurality of search terms in the search query may be treated and transformed separately.

In some embodiments of the invention, the processed search query may include substantially only deterministically transformed search terms, wherein the deterministic transformation may be a reversible transformation. The network node may search for the processed terms, and may return the result set to the client. The intermediate module may use the processed search terms to obtain original input text.

In some embodiments of the invention, transforming the search query may further comprise non-deterministically transforming substantially the entire search query using a second key to produce a non-deterministically transformed text, and combining the at least one deterministically transformed search term and the non-deterministically transformed text using a logical disjunction operator (e.g., the "OR" operator) to obtain a combined processed text, wherein transmitting the processed input text to the server comprises transmitting the combined processed text to the server. The network node may search for the processed search terms and for the non-deterministically processed text in disjunction, obtaining (or failing to find) results based on the deterministically transformed search terms, and obtaining no results for the non-deterministically transformed text. The result of the search may therefore be to return the result of the search on the processed search terms. Using the above method according to an embodiment of the invention, the intermediate module may receive from the network node the non-deterministically transformed text, from which it may then obtain the original input text of the search query.

Repository of Processed Texts

Some network node servers may return truncated search results in response to a query or other requests. For example, if the result of a search query is a 100 character field, the server may return only the first 20 characters of the field, and if the user selects the found record, the server will provide the full field. According to embodiments of the invention, the intermediate module should be able to work within such constraints. According to embodiments of the invention, where the server truncates units of the processed text, these units may be individual tokens within the processed text, the processed text as a whole, or both.

According to embodiments of the invention, this problem may be solved, for example, by providing a repository of processed texts at the intermediate module, or at a storage device managed or otherwise controlled or accessible by the intermediate module. The system may attempt to recover from such truncations before obtaining the original input text during the decryption stage, as follows: (1) the intermediate module may store unabridged processed text units at a trusted storage during the encryption stage, e.g., not via the untrusted server or its associated storage device, (2) when a truncated processed text is sent from the server and received at the intermediate module, the trusted storage unit is consulted to determine whether there exists therein one or more non-truncated processed text units matching or corresponding to the truncated processed text units, (3) if so, the intermediate module replaces the truncated processed text units with the corresponding unabridged processed text units to obtain a recovered processed text, (4) the recovered processed text are processed by a reverse processing method (e.g. decryption using a secret key) to obtain the original input text. The original input text, or unprocessed text, may then be provided to the client device, if required.

In some embodiments of the invention, what is stored in the repository may be at least one unabridged processed element associated with the processed text. For example, the processed element may be said entire processed text or a word or other portion contained in the processed text.

It will be recognized the system and method using the repository may be applied to any suitable request from the client device, including, for example, a search request, a record request, or a report request.

Detection of Untrusted Server Transformations Using Bait

An untrusted server may often apply one or more of a multitude of transformations on instances of processed user data. Such transformations may be expected by a client component residing on the trusted workstation, but may not be known to the intermediate module described herein. According to embodiments of the invention, therefore, the intermediate module may utilize methods to infer the kind of transformation applied to processed user data.

According to one embodiment of the invention, the intermediate module may add excess information (referred to herein as bait) to encrypted user data in known locations. Bait may be used when processed user data is received at the intermediate module in order to infer the kind of transformation applied to processed user data. Non-limiting examples of transformations for which bait may be used are application of a certain character encoding scheme and HTML tag elimination.

For example, an untrusted server may apply various and possibly combined encoding schemes to encrypted user data received thereat. When encrypted text is received at the intermediate module from the untrusted server, the encrypted text may be encoded in one of a multitude of encoding schemes used by an untrusted server application to communicate with the client component residing on the trusted workstation. The encoding scheme may or may not be indicated in the message generated by the server. The client component may typically be aware of the server component and may reliably know the encoding scheme used. However, the intermediate module may not be aware of the specific encoding used in every instance of encrypted text. Nevertheless, when decrypting user data before providing decrypted user data to the client component, the intermediate module according to embodiments of the invention should be able to use the same encoding scheme applied in the server and expected by the client. That is, if the intermediate module does not know the encoding scheme used by the untrusted server and the trusted workstation, information may become lost or garbled in the processing and deprocessing by the intermediate module.

To facilitate encoding scheme detection, the intermediate module may add predetermined characters known as encoding bait to encrypted text. The encoding bait may be encoded by the server along with the encrypted user data before providing to the client component. When the intermediate module detects encrypted tokens, the encoding bait may be examined to infer the kind of encoding scheme being used for encoding an instance of encrypted text. Accordingly, the intermediate module may use the inferred encoding scheme to encode decrypted text in a processed message. Non-limiting examples of encoding schemes include: (i) UTF-8 encoding, (ii) encoding using HTML escape sequence followed by UTF-8; and (iii) encoding using JavaScript escape sequences, then again using JavaScript escape sequences, and then performing Latin-1 encoding (AKA ISO-8859-1). For example, JavaScript escaping typically operates by replacing characters with a backslash and another character; for example, the newline character is replaced with a backslash and the character "n", i.e. the sequence "\n".

In some embodiments of the invention, bait may be used to detect at least one transformation including replacement of at least one transformable character in the processed text with a matching replacement character or replacement character string, e.g., one or more escape characters.

An example of using encoding bait composed of an angle bracket "<" and a backslash "\" is provided herein. The user may input the string "This ' is a quote". This is encrypted, for example, into "QIFJDJNZOP". During encryption, bait is attached to an encrypted token so that "QIFJDJNZOP" becomes "<\QIFJDJNZOP", in which <\ is the bait. The server may receive the encrypted string, and send the string to the client in a JavaScript file. In a JavaScript file, the server needs only to escape the backslash, but not the angle bracket. Accordingly, the message sent to the client includes: "<\\QIFJDJNZOP", in which the original backslash of the bait is escaped using another backslash. When the intermediate module detects the encrypted token in the message preceded by the original angle bracket and the escaped backslash, it may infer that the token is JavaScript-escaped. Thereupon, the intermediate module may decrypt the input QIFJDJNZOP into "This ' is a quote". However, having inferred that the client is expecting a JavaScript-escaped text, the module may then use JavaScript escaping to encode the decrypted string, e.g., by escaping the quote to produce "This \' is a quote". The decrypted quote is thus using the encoding rules inferred from the encoded bait. The decrypted and encoded string is then forwarded to the client.

Another example for which bait may be used is HTML transformations, of which HTML tag elimination is a special case. An untrusted server may receive text augmented with HTML markup, generate instances of received text with all or some HTML tags removed, and may return these instances to the client component. In such cases, the intermediate module may include an HTML tag bait in processed user data. The HTML tag bait may be removed by the intermediate module when receiving processed user data, and infer, from its existence or inexistence, whether HTML tags may be removed from decrypted user data, and may accordingly retain or remove decrypted HTML tags in a message returned to the client component.

It will be recognized that in some embodiments, multiple pieces of bait may be added to a processed text to detect a plurality of transformations or encoding schemes applied by the untrusted server.

Length Limits

In some embodiments of the invention, a plurality of separate portions of the input text may be transformed in which at least one of the plurality of portions of said input text includes no more than a maximum number of characters, for example, by truncation of the respective portion. In some embodiments of the invention, a plurality of separate portions of the input text may be transformed in which each of the plurality of portions of said input text includes no more than a maximum number of characters, for example, by truncation of the respective portion.

Tokenization Example

Figure 5:
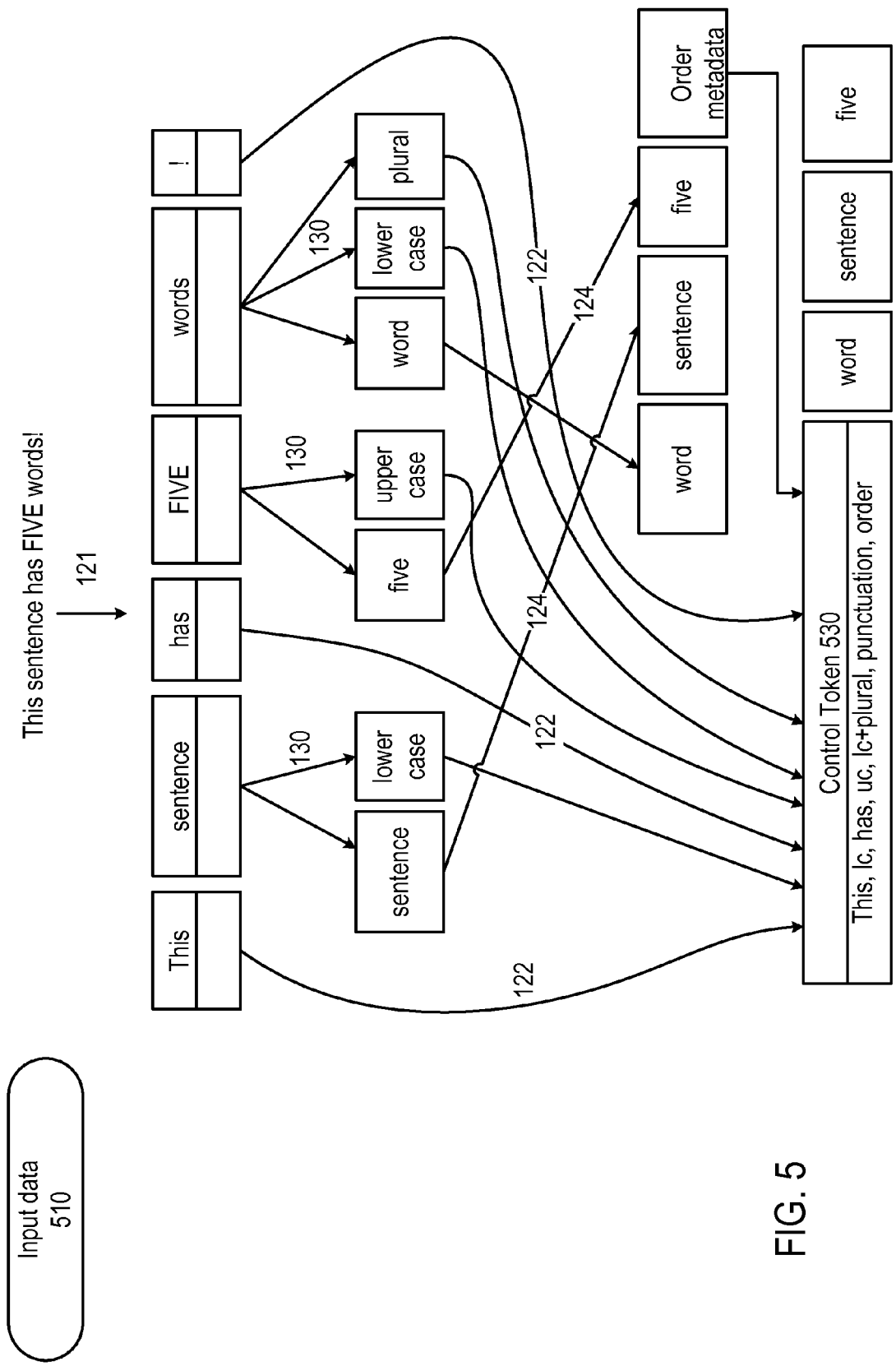
FIG. 5 illustrates an example of a normalization process and an input text that includes a sentence.

Reference is made to FIG. 5, which illustrates the normalization and tokenization of an input text that includes the sentence "This sentence has FIVE words!" Input text 510 includes the sentence "This sentence has FIVE words!" The sentence may be tokenized to the following input tokens "This", "sentence", "has", "FIVE", "words", and "!". These input tokens may be normalized to provide normalized input tokens and metadata. The normalized input tokens have the following format: "This", "sentence", "has", "five", "words", and "!". The metadata associated with "sentence" is "lower case". The metadata associated with "FIVE" is "upper case". The metadata associated with "words" is "lower case" and "plural".

Next, the method may detect common input tokens, including the words "this", "has" and the non-word "!". These input tokens may be encrypted in a non-deterministic manner, e.g., they may be encrypted with salt (denoted "*").

The method may detect uncommon input tokens "word", "sentence" and five". These words may be encrypted in a deterministic manner.

The order of input tokens may be changed and order metadata may be generated accordingly. The order metadata, the case metadata, and the plural metadata may be included in a control token 530.

Sort Support

A text processing feature common in many SaaS applications is sorting records by lexicographic order of a particular field or other attribute. It may therefore be beneficial to provide processed text by an order-preserving encryption process.

Any of a number of order-preserving approaches may be implemented. For example, order preservation can be obtained by any of the following methods: (i) maintaining a list of all records on the interception module, performing site-specific ordering when needed. This method requires almost duplication of each server's functionality in both presentation and data management; (ii) providing an API for the server to query the sort order of a particular string; or (iii) creating a lexicographically sortable representation which preserves the real sort order without any modification in the network node.

An encryption method according to the present invention may preserve order of input text records by applying the following stages or a combination thereof: (1) converting input data into a numeric values (if not already numeric), (2) applying an order-preserving transformation on the numerical values to obtain output numeric value, (3) obtaining a lexicographically sortable representation from the output numeric value, and (4) using the lexicographically sortable representation in the processed output text, as either a prefix string (in textual data) or as the whole output data. The order-preserving transformation may be a monotonously increasing function. The order preserving function may use a private key that can be generated from a random source, in order to parameterize its functionality A private key may be generated for every set of inputs sorted collectively as a set. According to embodiments of the invention, generating order information, as described further below, may include applying an order-preserving, secret-key-dependent function on the input text.

According to some embodiments of the invention, order information may be produced based on a truncated version of the input text. According to yet further embodiments of the invention, the order information may be produced based on a plurality of truncated words in the input text, in the order in which they appear therein.

According to some embodiments of the invention, the intermediate module may process input text by applying an order-preserving transformation, wherein the order-preserving transformation comprises generating order information based on the input text, the order information indicative of a relative order of the input text within a set of possible input texts according to a collation rule, transforming the input text to obtain processed text, and transmitting the processed text to the server. According to some embodiments of the invention, the order information may be sent to the server in association with said processed input text by adding the order information as a prefix to the processed input data and transmitting the combined order information and processed input data to the server.

In order to reduce security risks associated with order preserving encryption schemes, the intermediate device may consider only a reduced portion of the input data when generating an order-preserved output. Reducing the input to obtain a reduced portion of the input data may include (a) ignoring certain words such as "the", "a", (b) ignoring all characters in every word occurring at a certain position within the word or later, e.g. ignoring the characters "ra" in "zebra", (c) ignoring final words within the record (d) contracting the input domain of the order-preserving function, (e) ignoring certain character properties such as letter case, or (e) a combination thereof.

Figure 7:
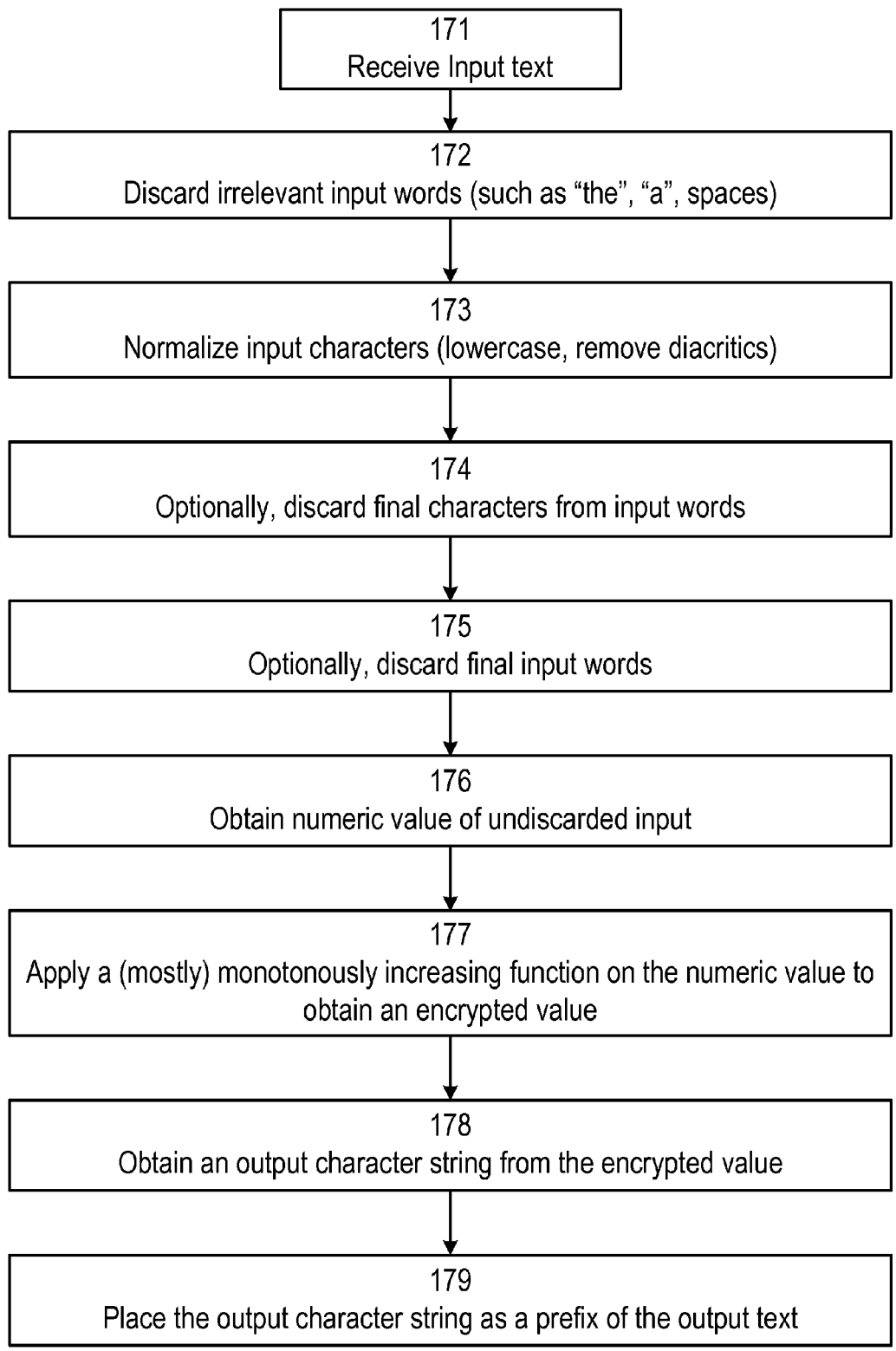
FIG. 7 illustrates a method for encrypting data allowing server-side sorting of encrypted data, according to an embodiment of the invention.

FIG. 7 illustrates various stages of method 170 according to an embodiment of the invention that may be used to obtain an order-preserving representation of textual data to be included in processed text. At stage 171, input text to be encrypted may be received. At stage 172 certain words may be discarded from the input text. At stage 173, certain character properties may be discarded, such as letter case, diacritics, ligatures or other character properties. At stage 174, input words may be truncated according to a predetermined parameter of the encryption scheme, such that final characters from input words may be discarded.

At stage 175, certain final words of the input text may be discarded. Accordingly, performing one or more of optional stages 172, 173, 174, and 175 may produce a reduced input text. At stage 176, the (optionally reduced) input text may be converted into a numeric value to obtain a input numeric value. At stage 177, an order-preserving function may be applied to the input numeric value to obtain an output numeric value. At stage 178, an order preserving representation may be obtained from the output numeric value. Finally, at stage 179, the order preserving representation may be placed as either a prefix or the whole encrypted data of the processed text.

In the below example illustrating an application of stages 172-176, the input numeric value of input text "The Green Zebra" may calculated as follows: (i) receiving a set of input tokens "The Green Zebra"; (ii) ignoring irrelevant input token "the" to provide relevant input tokens "Green Zebra", (iii) normalizing the relevant input tokens to provide "green zebra"; (iii) selecting, for example, based on user definitions, only the first three letters of every input token, to provide six relevant characters: "gre zeb"; (iv) calculating the numeric value as shown in Table 1 of each letter based on the weight of its location in the input token; and (v) summing up the letters values to provide a numeric value of the set of input tokens which is 0.296199790068345.

The weight W may represent the size of the alphabet A, raised to the negative power of the position of the character P, i.e., $W=A^{-P}$). For English text, the alphabet size is 26.

TABLE 1

| Letter | Alphabetic Value | Position (P) | Weight (W) | Weighted Value |
|---|---|---|---|---|
| G | 7 | 1 | 0.03846153846153850000 | .26923076923076900000000000 |
| R | 18 | 2 | 0.00147928994082840000 | .02662721893491120000000000 |
| E | 5 | 3 | 0.00005689576695493860 | .00028447883477469300000000 |
| Z | 26 | 4 | 0.00000218829872903610 | .00005689576695493860000000 |
| E | 5 | 5 | 0.00000008416533573216 | .00000042082667866078800000 |
| B | 2 | 6 | 0.00000000323712829739 | .00000000647425659478136000 |

Figure 8:
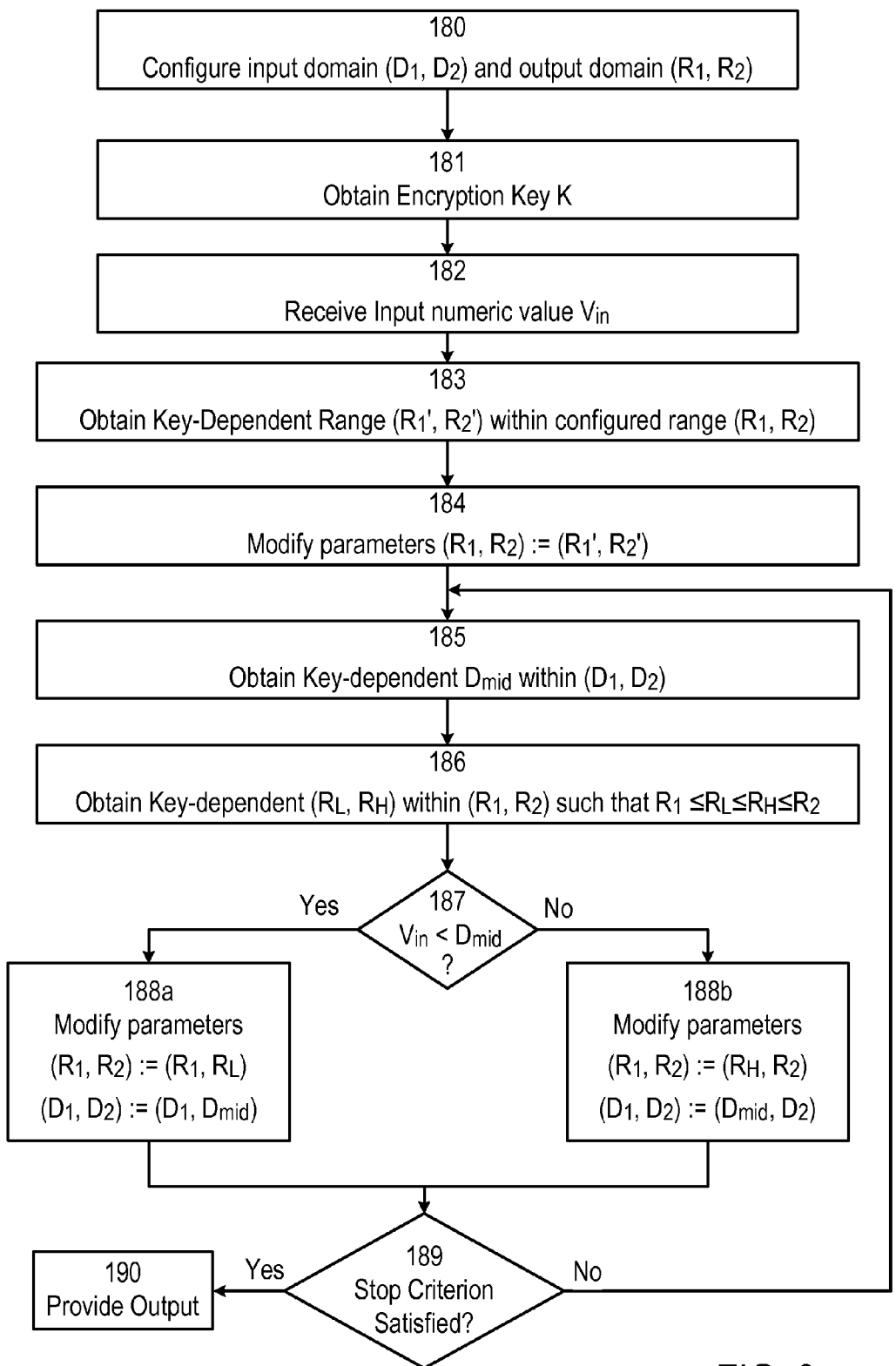
FIG. 8 illustrates a method of generating an order preserving function, according to an embodiment of the invention.
Figure 9:
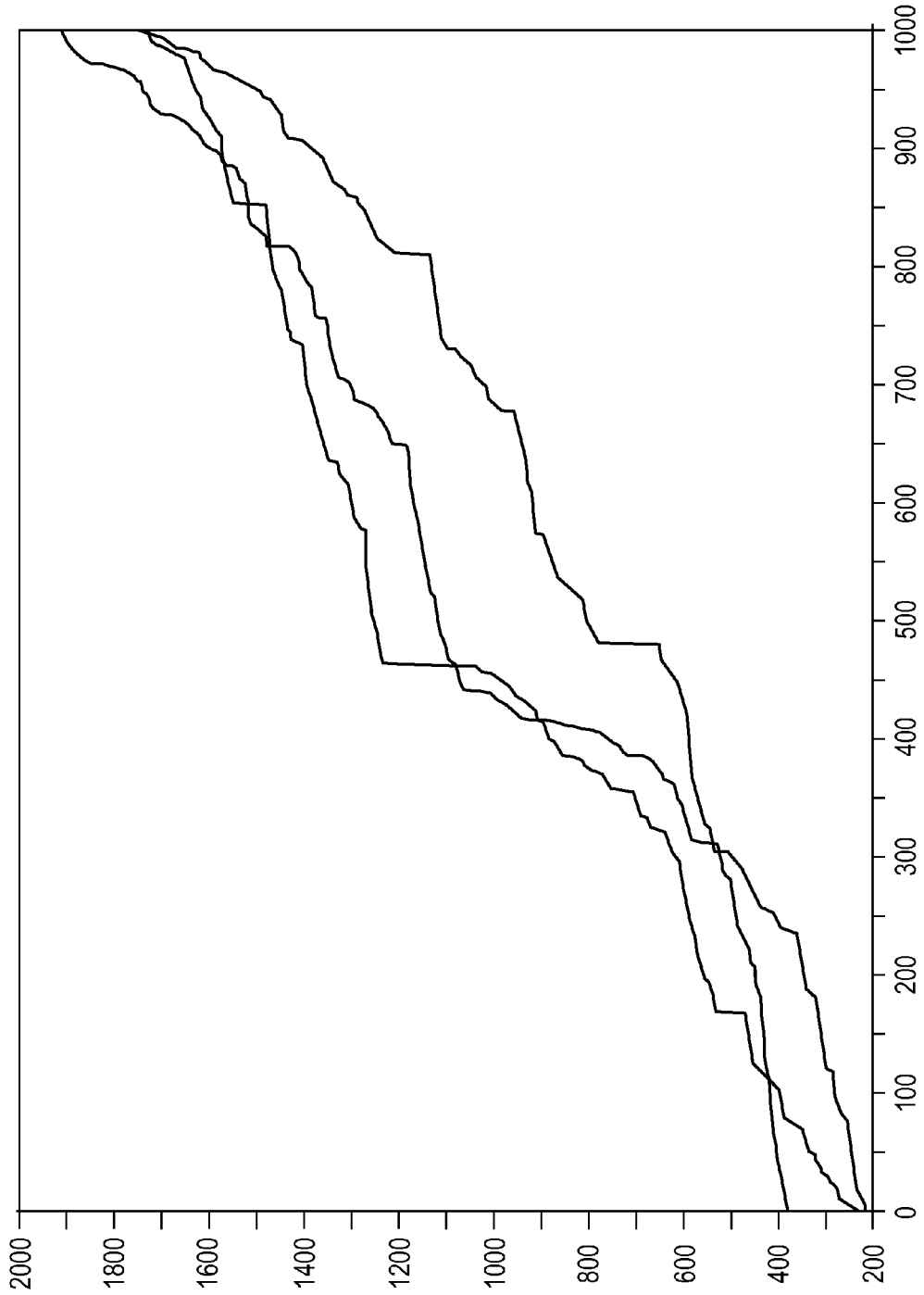
FIG. 9 illustrates an example of three generated order-preserving encryption function using three different keys according to an embodiment of the invention.

FIG. 8 illustrates a method 300 of generating an order-preserving function according to an embodiment of the invention, to be used, for example, in stage 177 of method 170. At stage 180, the domain $(D_1, D_2)$ and range $(R_1, R_2)$ of the function may be determined, for example, according to configuration by a user or program. At stage 181, a private key K is obtained to be used in calculation of the order-preserving function output value. At stage 182, an input value $V_{in}$ is received (possibly from stage 176 of method 170). At stages 183 and 184, the function range may be altered, so it starts and ends at key-dependent positions, lying within the original range. At stage 185, a point $D_{mid}$ lying inside the function's domain may be selected, wherein $D_{mid}$ is dependent on the function's key K, such that $D_{mid}=f_1(D_1, D_2, K)$. At stage 186, points $R_L=f_2(R_1, R_2, K, n)$ and $R_H=f_3(R_1, R_2, K, n)$ may be selected, such that $R_1<R_L<R_H<R_2$, where $R_L$ and $R_H$ may depend on the function's key K and/or the iteration number n, where initially n=1. At stage 187, the numeric input value $V_{in}$ is checked to see whether it lies within the lower part ($D_1$, $D_{mid}$) or higher part ($D_{mid}$, $D_2$) of the current domain ($D_1$, $D_2$). If $V_{in}$ lies within the lower part, then stage 188a is carried out, otherwise stage 188b is carried out. At stage 188a and 188b, the function's domain ($D_1$, $D_2$) and range ($R_1$, $R_2$) are modified: in stage 188a, ($D_1$, $D_2$) is set to ($D_1$, $D_{mid}$) and ($R_1$, $R_2$) is set to ($R_1$, $R_L$); in stage 188b, ($D_1$, $D_2$) is set to ($D_{mid}$, $D_2$) and ($R_1$, $R_2$) is set to ($R_H$, $R_2$). Stages 185-188 may be repeated until a predetermined stop criterion is satisfied at stage 189. The stop criterion may be for example a threshold size $D_{threshold}$ being greater than the current domain size $|D|=D_2-D_1$; or a threshold size $R_{threshold}$ being greater than the current range size $|R|=R_2-R_1$; or a combination thereof.

The following example illustrates an encoding scheme which may be used in stage 178 of method 170. It is assumed that the transformed numeric value generated by an order preserving function is 0.344323947, that the lexicographically sortable representation is ten characters long and includes only lowercase English letters only. Table 2 illustrates the ten iterations of an arithmetic coding scheme that is applied to generate ten characters of the lexicographically sortable representation.

TABLE 2

| Letter number | $Value_n$ (= 26 × ($Value_{n-1}$ − $Rounded_{n-1}$ ÷ 26)) | Letter value (×26) | Rounded value | Output letter |
|---|---|---|---|---|
| 1 | 0.344323947 | 8.952422617 | 8 | h |
| 2 | 0.952422617 | 24.76298804 | 24 | x |
| 3 | 0.762988037 | 19.83768896 | 19 | s |
| 4 | 0.837688957 | 21.77991288 | 21 | u |
| 5 | 0.779912877 | 20.2777348 | 20 | t |

TABLE 2-continued

| Letter number | $Value_n$ (= 26 × ($Value_{n-1}$ − $Rounded_{n-1}$ ÷ 26)) | Letter value (×26) | Rounded value | Output letter |
|---|---|---|---|---|
| 6 | 0.277734797 | 7.221104712 | 7 | g |
| 7 | 0.221104712 | 5.748722505 | 5 | e |
| 8 | 0.748722505 | 19.46678512 | 19 | s |
| 9 | 0.46678512 | 12.13641313 | 12 | l |
| 10 | 0.136413127 | 3.546741304 | 3 | c |

As indicated by Table 2, the lexicographically sortable representation is "hxsutgeslc".

A physical computer readable medium can be provided. It stores instructions that when executed by a processor can cause the processor to implement method 100 or portions thereof. The physical computer readable medium can be a disk, a diskette, a tape, a cassette, a disk on key, a flash memory unit, a volatile memory unit, and the like.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method comprising:
   intercepting, by an intermediate module, input data sent from a client device to a server;
   selecting, by the intermediate module, whether or not to process the input data and, if selecting not to process the input data then transmitting, by the intermediate module, the input data to the server without processing the input data;
   if selecting to process the input data then selecting, by the intermediate module, whether or not to transform the input data, and, if selecting to transform the input data, selecting, by the intermediate module, whether to transform the input data based on a mapping of input data to encrypted data or based on an encryption key, transforming, by the intermediate module, the input data to produce processed data, and transmitting, by the intermediate module, the processed data to the server;
   if not selecting to transform said input data then providing, by the intermediate module, at least one function on the input data; and generating, by the intermediate module, at least one message to the client device based on a result of said function.

2. The method of claim 1 further comprising:
   obtaining at the intermediate module a response to said at least one message from said client device;
   based on said response, processing the input text to obtain processed input text; and
   transmitting the processed input text to the server.

3. The method of claim 1, wherein said function is a spell-checking function, and wherein the message is a result of said spell-checking function on said input data.

4. The method of claim 1, wherein said function is format-checking function on said input data, wherein said input data is in a first format, and wherein said message is a request to provide said input data in a second format different from said first format.

5. The method of claim 4, wherein said first format is a delta-encoded format, and wherein said second format is a full input text format.

6. The method of claim 1, wherein said intermediate module is a software plug-in module installed in said client device.

7. The method of claim 1, wherein said intermediate module is an intermediate server computer connected to said client device and to said server.

8. A system comprising: a server, a client device, and an intermediate module, the intermediate module operatively connected between the client device and the server and configured to:
   receive input data from the client device;
   select whether or not to process the input data and, if selecting not to process the input data then transmit the input data to the server without processing the input data;
   if selecting to process the input data then select whether or not to transform said input data, and, if selecting to transform the input data, select whether to transform the input data based on a mapping of input data to encrypted data or based on an encryption key, transform the input data to produce processed data, and transmit said processed data to the server; and
   if not selecting to transform said input data then provide at least one function on the input data and generate at least one message to the client device based on a result of said function.

9. The system of claim 8, wherein said intermediate module is further configured to:
   obtain a response to said at least one message from said client device;
   based on said response, process the input text to obtain processed input text; and
   transmit the processed input text to the server.

10. The system of claim 8, wherein said function is a spell-checking function, and wherein the message is a result of said spell-checking function on said input data.

11. The system of claim 8, wherein said function is format-checking function on said input data, wherein said input data is in a first format, and wherein said message is a request to provide said input data in a second format different from said first format.

12. The system of claim 11, wherein said first format is a delta-encoded format, and wherein said second format is a full input text format.

13. The system of claim 8, wherein said intermediate module is a software plug-in module installed in said client device.

14. The system of claim 8, wherein said intermediate module is an intermediate server computer connected to said client device and to said server.

* * * * *